(12) United States Patent
Kanai et al.

(10) Patent No.: US 12,436,548 B2
(45) Date of Patent: Oct. 7, 2025

(54) FLOW RATE CONTROL DEVICE, FLOW RATE CONTROL DEVICE CONTROL METHOD, AND FLOW RATE CONTROL DEVICE CONTROL PROGRAM

(71) Applicant: Fujikin Incorporated, Osaka (JP)

(72) Inventors: Yoshitomo Kanai, Osaka (JP); Takahiro Nozawa, Osaka (JP)

(73) Assignee: Fujikin Incorporated, Osaka (JP)

( * ) Notice: Subject to any disclaimer, the term of this patent is extended or adjusted under 35 U.S.C. 154(b) by 566 days.

(21) Appl. No.: 17/760,395

(22) PCT Filed: Feb. 18, 2021

(86) PCT No.: PCT/JP2021/006096
§ 371 (c)(1),
(2) Date: Aug. 9, 2022

(87) PCT Pub. No.: WO2021/166997
PCT Pub. Date: Aug. 26, 2021

(65) Prior Publication Data
US 2023/0063996 A1    Mar. 2, 2023

(30) Foreign Application Priority Data

Feb. 21, 2020  (JP) .................................. 2020-028277

(51) Int. Cl.
*G05D 7/00* (2006.01)
*G05B 19/416* (2006.01)
*G05D 7/06* (2006.01)

(52) U.S. Cl.
CPC ......... *G05D 7/0623* (2013.01); *G05B 19/416* (2013.01); *G05D 7/0635* (2013.01); *G05B 2219/37371* (2013.01)

(58) Field of Classification Search
None
See application file for complete search history.

(56) References Cited

U.S. PATENT DOCUMENTS 9,459,629 B2   10/2016  Takijiri
10,248,137 B2   4/2019  Ito et al.
(Continued)

FOREIGN PATENT DOCUMENTS

CN    104407630 B    3/2015
JP    2014-59609 A   4/2014
(Continued)

*Primary Examiner* — Paul B Yanchus, III
(74) *Attorney, Agent, or Firm* — WCF IP

(57) ABSTRACT

A flow rate control device for rapidly adjusting a flow rate to a set flow rate is provided. A flow rate control device for controlling a flow rate of a fluid supplied to a controlled object to hold a flow rate set value in the controlled object includes a measured value acquisition unit acquiring a measured value by a flow rate sensor measuring a flow rate of the fluid, a setting value acquisition unit acquiring the flow rate set value of the fluid, an adjustment value determination unit determining a flow rate adjustment value different from the flow rate set value, and a drive control unit controlling the flow rate of the fluid by adjusting an opening position of a valve supplying the fluid to the controlled object to make a difference between the measured value and the flow rate adjustment value small.

15 Claims, 6 Drawing Sheets

(56) References Cited

U.S. PATENT DOCUMENTS

| | | | |
|---|---|---|---|
| 10,969,019 B2 | 4/2021 | Yasuda et al. | |
| 2014/0116538 A1* | 5/2014 | Tanaka | G05D 7/0635 |
| | | | 137/486 |
| 2014/0374634 A1 | 12/2014 | Ohtsuki et al. | |
| 2017/0168509 A1 | 6/2017 | Ito et al. | |

FOREIGN PATENT DOCUMENTS

| | | |
|---|---|---|
| JP | 5867517 B2 | 2/2016 |
| JP | 2018-206387 A | 12/2018 |
| KR | 2017-0033859 A | 3/2017 |

* cited by examiner

FLOW RATE CONTROL DEVICE, FLOW RATE CONTROL DEVICE CONTROL METHOD, AND FLOW RATE CONTROL DEVICE CONTROL PROGRAM

TECHNICAL FIELD

The present invention relates to a flow rate control device, and a method and a control program for the flow rate control device.

BACKGROUND ART

There is known a flow rate control device for adjusting a flow rate of a fluid flowing downstream to a set value by adjusting a control valve based on a flow rate measured by a flow rate sensor.

The Patent Document 1 discloses that in a flow rate control device for applying a voltage to a piezoelectric element so as to change a flow rate to correspond to a target flow rate, when a flow rate adjusting valve is closed and the target flow rate changes, a signal corresponding to a voltage change indicating a larger amplitude with respect to a target voltage value corresponding to the target flow rate after the change is transiently output, and then the voltage is changed so as to converge to the target voltage value.

CITATION LIST

Patent Literature

Patent Literature 1: JP 5867517 B2

SUMMARY OF INVENTION

Technical Problem

One of the objects of the present invention is to rapidly adjust a flow rate to a set flow rate.

Solution to Problem

A flow rate control device according to one aspect of the present invention is a flow rate control device for controlling a flow rate of a fluid supplied to a controlled object to hold a flow rate set value in the controlled object and the flow rate control device includes a measured value acquisition unit acquiring a measured value by a flow rate sensor measuring a flow rate of the fluid, a setting value acquisition unit acquiring the flow rate set value of the fluid, an adjustment value determination unit determining a flow rate adjustment value different from the flow rate set value, and a drive control unit controlling the flow rate of the fluid by adjusting an opening position of a valve supplying the fluid to the controlled object to make a difference between the measured value and the flow rate adjustment value small.

The flow rate adjustment value may include an initial adjustment value set after setting of the flow rate set value; and the initial adjustment value may be equal to or greater than the flow rate set value.

The flow rate control device may further include a valve output acquisition unit acquiring the drive voltage of the vale, and the adjustment value determination unit may change the flow rate adjustment value when the drive voltage of the valve reaches a predetermined valve target value.

The adjustment value determination unit may hold a transient adjustment value, larger than the flow rate set value, as the flow rate adjustment value after the initial adjustment value.

The flow rate control device may further include a flow rate target value determination unit determining a flow rate target value that is different from the flow rate set value and is a temporary target value of the measured value, and the adjustment value determination unit may change the flow rate adjustment value when the measured value becomes the flow rate target value.

The flow rate target value determination unit may change the flow rate target value when the adjustment value determination unit changes the flow rate adjustment value.

The flow rate target value determination unit may determine a flow rate target value that becomes a temporary target of the measured value when a transient adjustment value larger than the flow rate set value, and the adjustment value determination unit may change the flow rate adjustment value when the measured value reaches the flow rate target value.

A control method for a flow rate control device according to another aspect of the present invention is a control method for a flow rate control device for controlling a flow rate of a fluid supplied to a controlled object to hold a flow rate set value in the controlled object, and the method includes a step of acquiring a measured value by a flow rate sensor measuring a flow rate of the fluid, a step of acquiring the flow rate set value of the fluid, a step of determining a flow rate adjustment value different from the flow rate set value, and a step of controlling the flow rate of the fluid by adjusting an opening position of a valve supplying the fluid to the controlled object to make a difference between the measured value and the flow rate adjustment value small.

A control program for a flow rate control device according to another aspect of the present invention is a computer executable control program for a flow rate control device for controlling a flow rate of a fluid supplied to a controlled object to hold a flow rate set value in the controlled object, and the program includes instructions for acquiring a measured value by a flow rate sensor measuring a flow rate of the fluid, acquiring the flow rate set value of the fluid, determining a flow rate adjustment value different from the flow rate set value, and controlling the flow rate of the fluid by adjusting an opening position of a valve supplying the fluid to the controlled object to make a difference between the measured value and the flow rate adjustment value small.

Effect of the Invention

According to the present invention, the flow rate can be adjusted to a set flow rate at a high speed.

PREFERRED EMBODIMENT

An embodiment of a flow rate control device and its control method and control program will be described below with reference to the drawings.

Overview of Flow Rate Control Device

A flow rate control device 1 is a device that controls to hold a flow rate in a controlled object in a flow rate set value. The flow rate control device 1 sets a flow rate adjustment value different from the flow rate set value, and the flow rate in the controlled object can quickly reaches the flow rate set value by controlling a valve that supplies fluid to the controlled object so that a difference between the flow rate adjustment value and a measured value becomes small.

Figure 1:
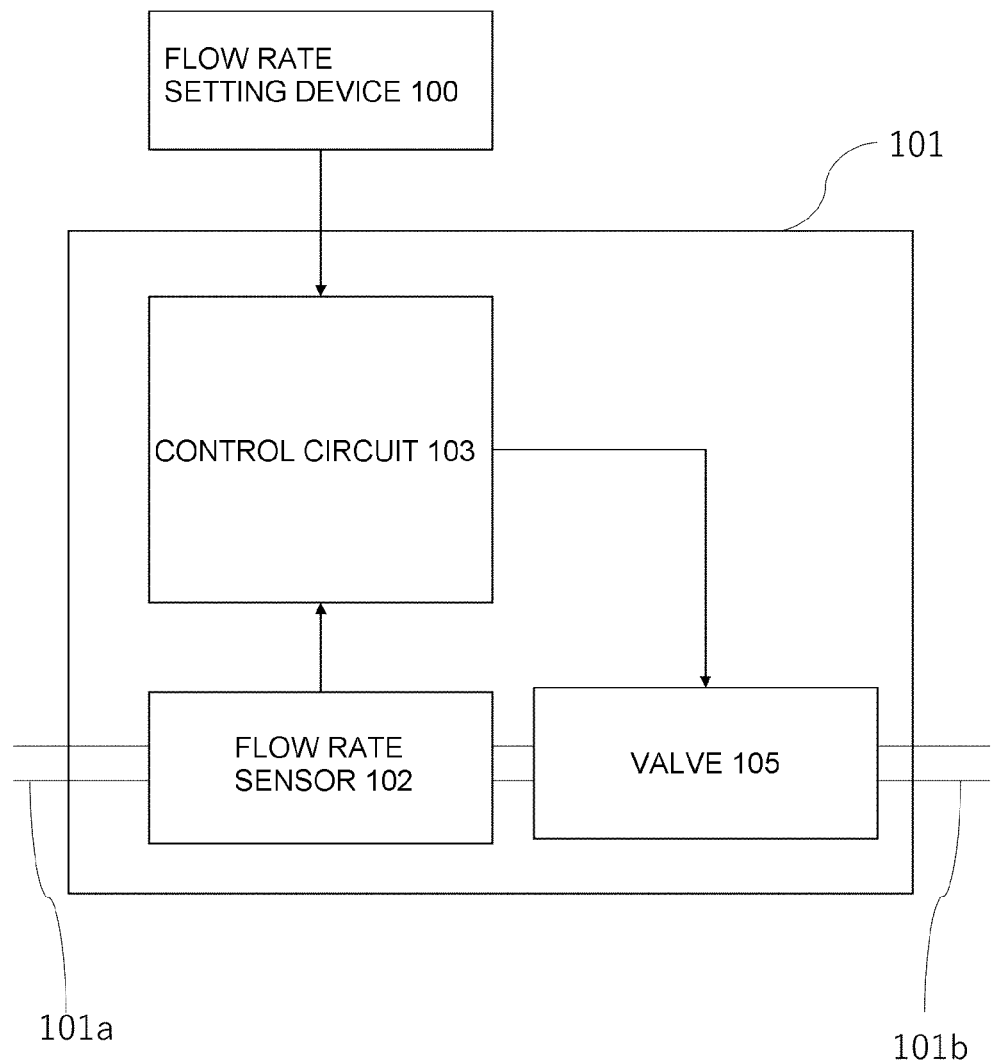
FIG. 1 is a diagram illustrating an overall schematic view of the flow rate control device according to the present invention.

As illustrated in FIG. 1, the flow rate control device 1 includes a valve body 101, a flow rate sensor 102, a control circuit 103, and a valve 105.

The valve body 101 is made of a steel material such as stainless and has a rectangular parallelepiped outer shape. The valve body 101 is located on a supply path of the fluid supplied to the controlled object, and an upstream of the valve body 101a is an upstream flow path 101a, and a downstream is a downstream flow path 101b. An upstream side of the upstream flow path 101a and a downstream side of the downstream flow path 101b are respectively connected to tubes through which controlled fluid flows.

The upstream flow path 101a is a flow path through which the fluid flows from the upstream side. The upstream flow path 101a branches off into a flow path flowing through the flow rate sensor 102 and a bypass flow path on the way, and then merges and flows out to the valve 105. The valve 105 is a valve body which is able to control an opening position connecting between the upstream flow path 101a and the downstream flow path 101b, and it is, for example, a solenoid valve driven by a voice coil. The down stream flow path 101b is configured such that the fluid where the flow rate is controlled by the valve 105 from the upstream side flows in and it flows out to the downstream side of the flow rate control device 1, such as to the controlled object.

The control circuit 103 is a device to acquire the flow rate set value and to control the valve 105 based on the measured value of the flow rate sensor 102 and the flow rate set value, and is configured by, for example, an electronic board. The control circuit 103 may be wired or wirelessly connected to an external flow rate setting device 100, and may acquire the flow rate set value from the flow rate setting device 100. The control circuit 103 controls the opening position of the valve 105 so that the flow rate drained from the downstream flow path 101b becomes the flow rate set value, for example, by performing a feedback control.

Circuit Configuration Inside Flow Rate Control Device

Figure 2:
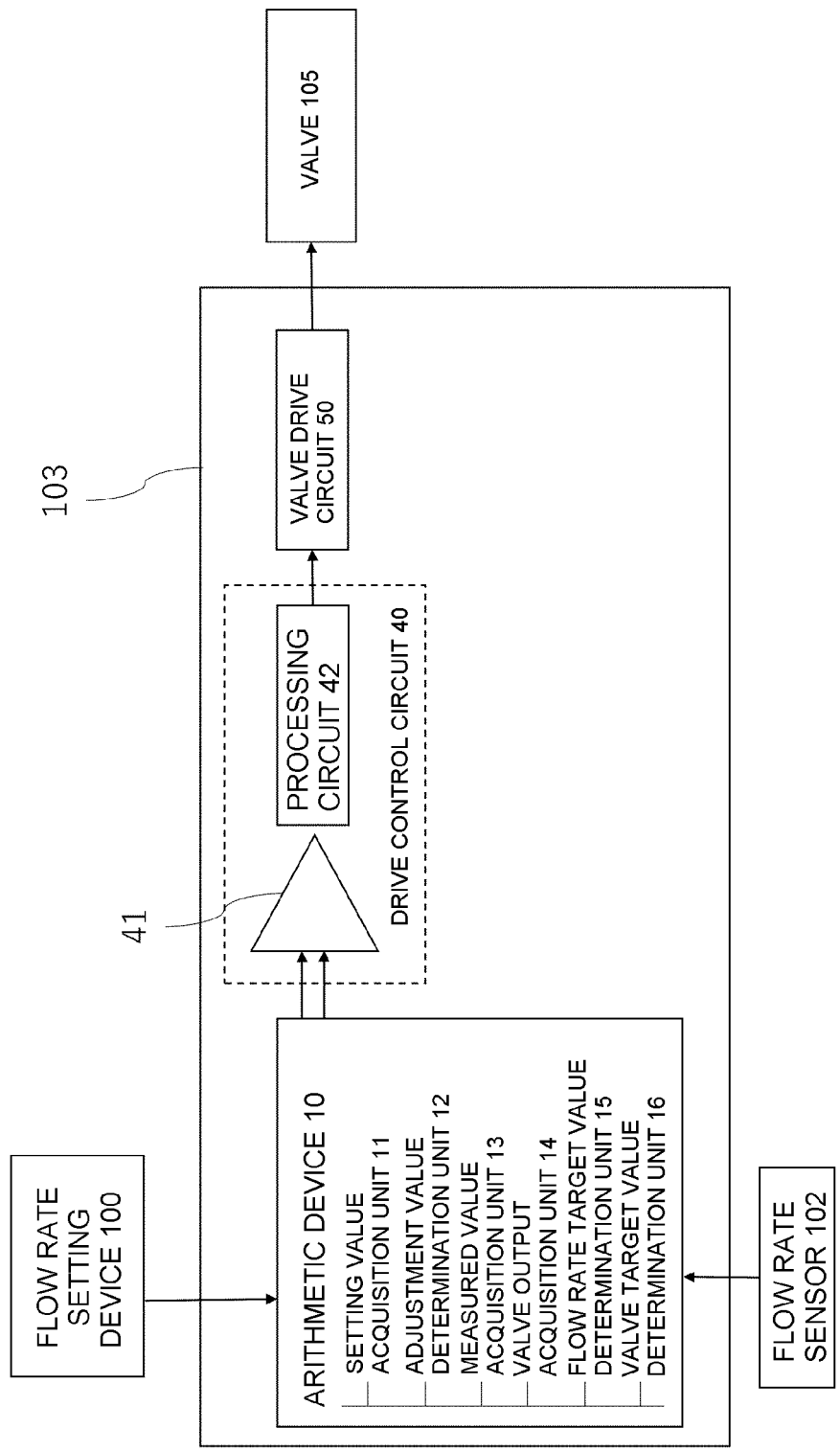
FIG. 2 is a schematic configuration diagram and a functional block diagram of a control circuit included in the flow rate control device.

As illustrated in FIG. 2, the control circuit 103 mainly includes an arithmetic device 10 for executing information processing, a drive control circuit 40, and a valve drive circuit 50.

The arithmetic device 10 is a device which acquires the flow rate set value from the flow rate setting device 100 and the measured value of the flow rate sensor 102, and outputs a signal to be referred to by the drive control circuit 40 for controlling drive of the valve 105, and is, for example, a CPU (Central Processing Unit). The signal measured by the flow rate sensor 102 may be input to the arithmetic device 10 via a sensor circuit for amplifying and filtering, an A/D conversion circuit for digitizing, and the like. An output signal from the arithmetic device 10 may be analogized via a D/A conversion circuit and input to the drive control circuit 40.

The drive control circuit 40, which is an example of a drive control unit, is a circuit that generates a drive signal for driving the valve with reference to the flow rate adjustment value, the measured value, and the signal determined by the arithmetic device 10, and outputs to the valve drive circuit 50. The flow rate adjustment value and the measured value are input to the drive control circuit 40. The drive control circuit 40 includes a comparison circuit 41 and a processing circuit 42. The comparison circuit 41 compares the flow rate adjustment value with the measured value. Based on a comparison result, the processing circuit 42 generates a signal to control the valve 105 so that a difference between the flow rate adjustment value and the measured value becomes small. The drive control circuit 40 increases the opening of the valve 105 as the flow rate adjustment value is larger than the measured value and the difference between the flow rate adjustment value and the measured value is larger.

The valve drive circuit 50 drives the valve 105 based on the signal from the drive control circuit 40, and adjust the opening position of the valve 105.

Functional Block of Arithmetic Device

The arithmetic device 10 includes at least a setting value acquisition unit 11, an adjustment value determination unit 12, a measured value acquisition unit 13, a valve output acquisition unit 14, a flow rate target value determination unit 15 and a valve target value determination unit 16, as software resources.

The setting value acquisition unit 11 is a functional unit to acquire the flow rate set value of the fluid. The flow rate set value is a final flow rate to be held by the flow rate control device 1 in the controlled object.

The measured value acquisition unit 13 is a functional unit to acquire the measured value of the flow rate sensor 102 of the fluid. The valve output acquisition unit 14 is a functional unit to acquire a drive voltage output to the valve 105 from the drive control circuit 40.

The adjustment value determination unit 12 is a functional unit to determine the flow rate adjustment value different from the flow rate set value. The adjustment value determination unit 12 may make the flow rate adjustment value larger than the flow rate set value. The flow rate adjustment value may be determined based on the flow rate set value.

The flow rate target value determination unit 15 is a functional unit to determine the flow rate target value that is a temporary target of the measured value. The valve target value determination unit 16 is a functional unit to determine the valve target value that is temporary target of the drive voltage of the valve 105.

Figure 3:
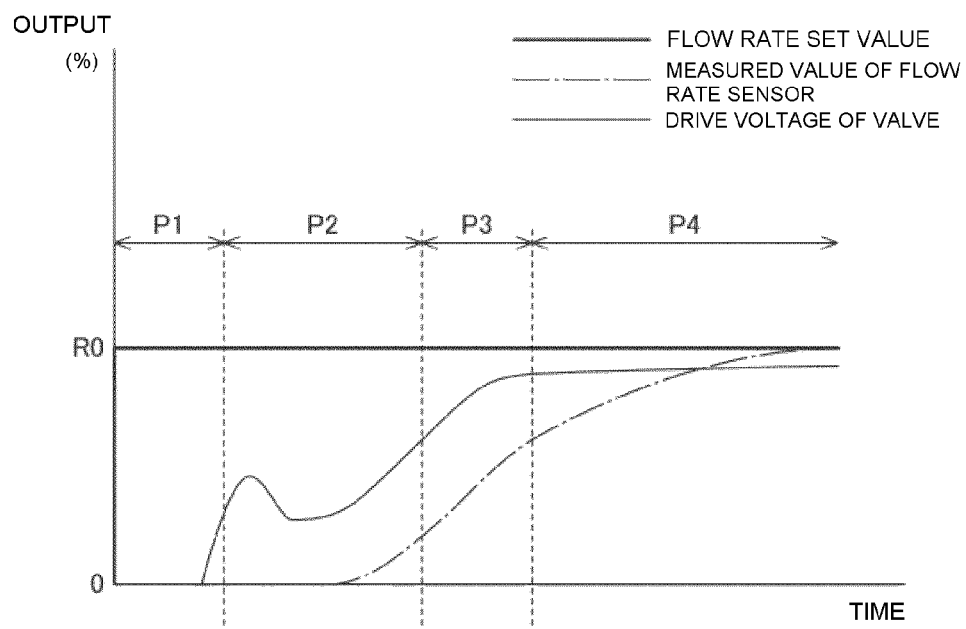
FIG. 3 is an example of a graph illustrating changes of values in the flow rate control device, (a) is a graph illustrating a flow set value, a measured value of the flow rate sensor, and a drive voltage of a valve, and (b) is a graph illustrating a change in a flow rate adjustment value for controlling the flow rate in comparison with a measured value of the flow rate sensor.
Figure 3:
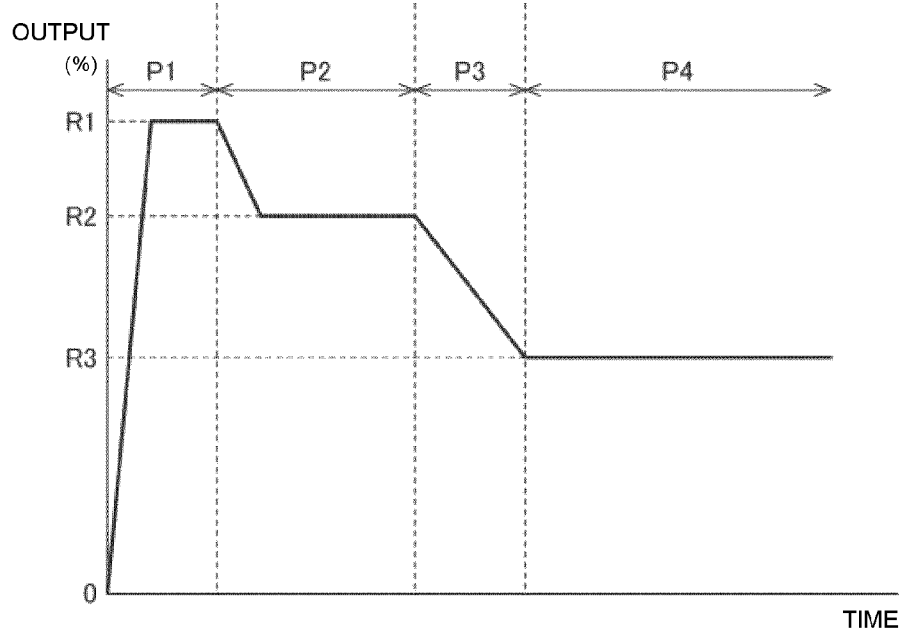

With reference to FIG. 3, an example for indicating how the flow rate is adjusted by the flow rate control device 1 will be described. As illustrated in FIG. 3(a), at a time "0," a flow rate set value R0 is set. Then, as illustrated in FIG. 3(b), the adjustment value determination unit 12 sequentially transitions a first adjustment period P1, a second adjustment period P2, and a third adjustment period P3, and determines the flow rate adjustment value in a different manner in each of the adjustment periods P1 to P3. In addition, the adjustment value determination unit 12 holds the flow rate adjustment value at a value equal to the flow rate set value during the adjustment period P4. In other words, the adjustment value determination unit 12 calculates a plurality of the flow rate adjustment values for one flow rate set value, and brings the measured value to the flow rate set value while changing the flow rate adjustment value.

More specifically, first, the adjustment value determination unit 12 gradually increases the flow rate adjustment value during the first adjustment period P1, and holds an initial adjustment value R1. Then, the adjustment value determination unit 12 starts the second adjustment period P2 from a predetermined point of time and gradually changes the flow rate adjustment value to a transient adjustment value R2 larger than the flow rate set value. The adjustment value determination unit 12 holds the flow rate adjustment value at the transient adjustment value R2 for a predetermined time. Then, the adjustment value determination unit 12 starts the third adjustment period P3 and gradually lowers the flow rate adjustment value from the transient adjustment value R2. Further, the adjustment value determination unit 12 starts the fourth adjustment period P4 at a predetermined point of time and holds the flow rate adjustment value at the final adjustment value R3 equivalent to the flow rate set value.

A length of each of the adjustment periods P1 to P3 may be predetermined, or a start of a next period may be determined based on an acquired value. For example, when the valve target value is determined by the valve target value determination unit 16 and the drive voltage of the valve 105 reaches the valve target value, the next period may be started. Further, when the flow rate target value which is a temporary target of the measured value is determined by the flow rate target value determination unit 15 and the measured value by the flow rate sensor 102 reaches the flow rate target value, the next period may be started.

More specifically, after a start of the adjustment period P1, the adjustment period P2 may be started after a predetermined time has elapsed. Further, after a start of the adjustment period P2, the adjustment period P3 may be started after a predetermined time has elapsed. After a start of the adjustment period P3, the adjustment period P4 may be started after a predetermined time has elapsed. In addition, the valve target values in each of the adjustment periods P1 to P3 are predetermined, and when the drive voltage of the valve 105 reaches a predetermined valve target value, the next adjustment periods P2 to P4 may be started. Further, the flow rate target values in each of the adjustment periods P1 to P3 are predetermined, and when the measured value reaches a predetermined flow rate target value, the next adjustment periods P2 to P4 may be started.

Furthermore, these may be combined. In other words, for example, in the adjustment period P1 and P2, the adjustment period P2 and P3 may be started after a predetermined time elapsed, and when the drive voltage of the valve 105 reaches the valve target value in the adjustment period P3, the adjustment period P4 may be started. Alternatively, when the measured value reaches the flow rate target value in the adjustment period P3, the adjustment period P4 may be started.

After the start of the adjustment period P1, the adjustment period P2 may be started after a predetermined time elapsed, and when the drive voltage of the valve 105 reaches the valve target value in the adjustment period P2 and P3, the adjustment period P3 and P4 may be started. Alternatively, when the measured value of the flow rate sensor 102 reaches the flow rate target value in the adjustment period P3, the adjustment period P4 may be started.

The adjustment period P2 may be started when the drive voltage of the valve 105 reaches a first valve target value in the adjustment period P1, the adjustment period P3 may be started when the drive voltage of the valve 105 reaches a second valve target value in the adjustment period P2, and the adjustment period P4 may be started when the measured value of the flow rate sensor 102 reaches the flow rate target value in the adjustment period P3.

The adjustment period P2 may be started when the drive voltage of the valve 105 reaches the valve target value in the adjustment period P1, the adjustment period P3 may be started when the measured value of the flow rate sensor 102 reaches a first flow rate target value in the adjustment period P2, and the adjustment period P4 may be started when the measured value of the flow rate sensor reaches a second flow rate target value in the adjustment period P3.

The adjustment period P2 may be started when the drive voltage of the valve 105 reaches the first valve target value in the adjustment period P1, the adjustment period P3 may be started when the measured value of the flow rate sensor 102 reaches the flow rate target value in the adjustment period P2, and the adjustment period P4 may be started when the drive voltage of the valve 105 reaches the second valve target value in the adjustment period P3.

In the present embodiment, the adjustment periods are three, but they may be two or less or four or more.

The initial adjustment value R1 is equal to or greater than the flow rate set value. Immediately after setting the flow rate set value, the flow rate set value and the measured value differ greatly. According to this configuration, since the opening position of the valve increases immediately after setting the flow rate set value, the flow rate in the controlled object can quickly reach the flow rate set value. The initial adjustment value R1 may be a value that maximizes the opening position of the valve 105.

The adjustment value determination unit 12 may hold the transient adjustment value R2 larger than the flow rate set value as the flow rate adjustment value after the initial adjustment value R1.

The transient adjustment value R2 may be smaller than the initial adjustment value R1. When the final adjustment value R3 is sufficiently smaller than the initial adjustment value R1, if the flow rate control is performed at the final adjustment value R3 immediately after the initial adjustment value R1, the valve 105 is temporary closed and the flow rate control takes time. According to a configuration in which the final adjustment value R3 is started after the initial adjustment value R1 via the transient adjustment value R2, the flow rate adjustment value is gradually reduced, and the flow rate control can be continued with the valve 105 sufficiently opened.

Figure 6:
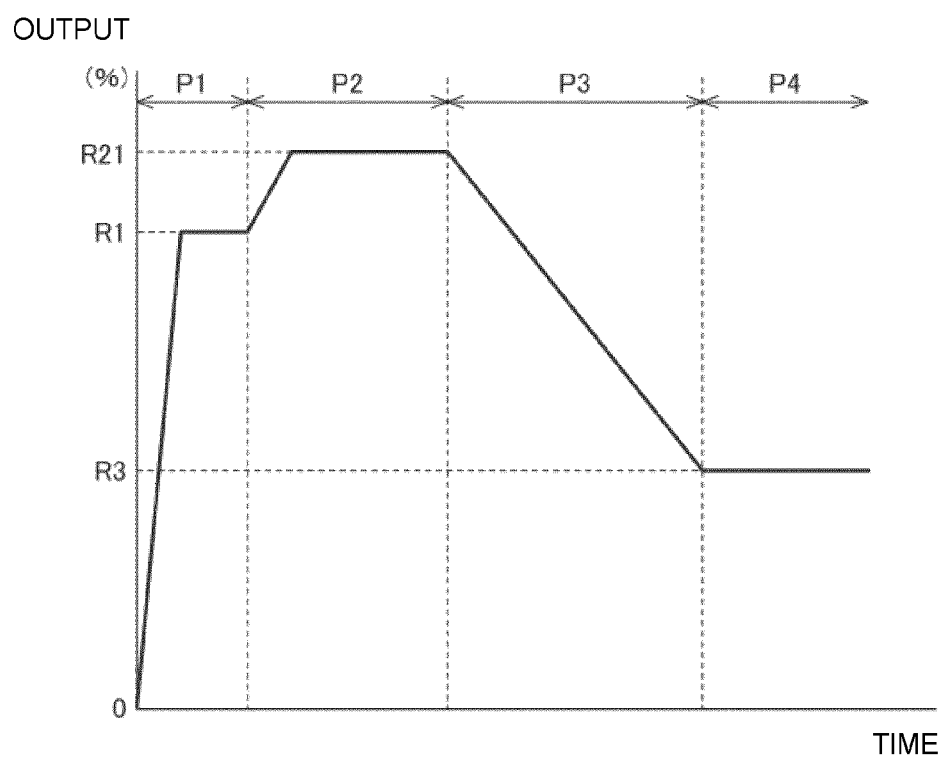
FIG. 6 is a graph illustrating another embodiment of a change in the flow rate adjustment value.

As illustrated in FIG. 6, transient adjustment value R21 may be larger than the initial adjustment value R1. When the final adjustment value R3 is equal to or greater than a predetermined value, the measured value can quickly reach the flow rate set value by setting the transient adjustment value R21 to a large value.

The adjustment value determination unit 12 may make the transient adjustment value R2 smaller than the initial adjustment value R1 when the final adjustment value R3 is less than a predetermined value, and the adjustment value determination unit 12 may make the transient adjustment value R2 larger than the initial adjustment value R1 when the final adjustment value R3 exceeds a predetermined value.

In the third adjustment period P3, the adjustment value determination unit 12 may gradually decrease the flow rate adjustment value at a constant inclination, or may decrease the flow rate adjustment value while changing the inclination. Further, the adjustment value determination unit 12 may decrease the flow rate adjustment value in phases. Furthermore, the third adjustment period P3 may determine a mode of change based on a difference between the transient adjustment value R2 and the final adjustment value R3.

Figure 4:
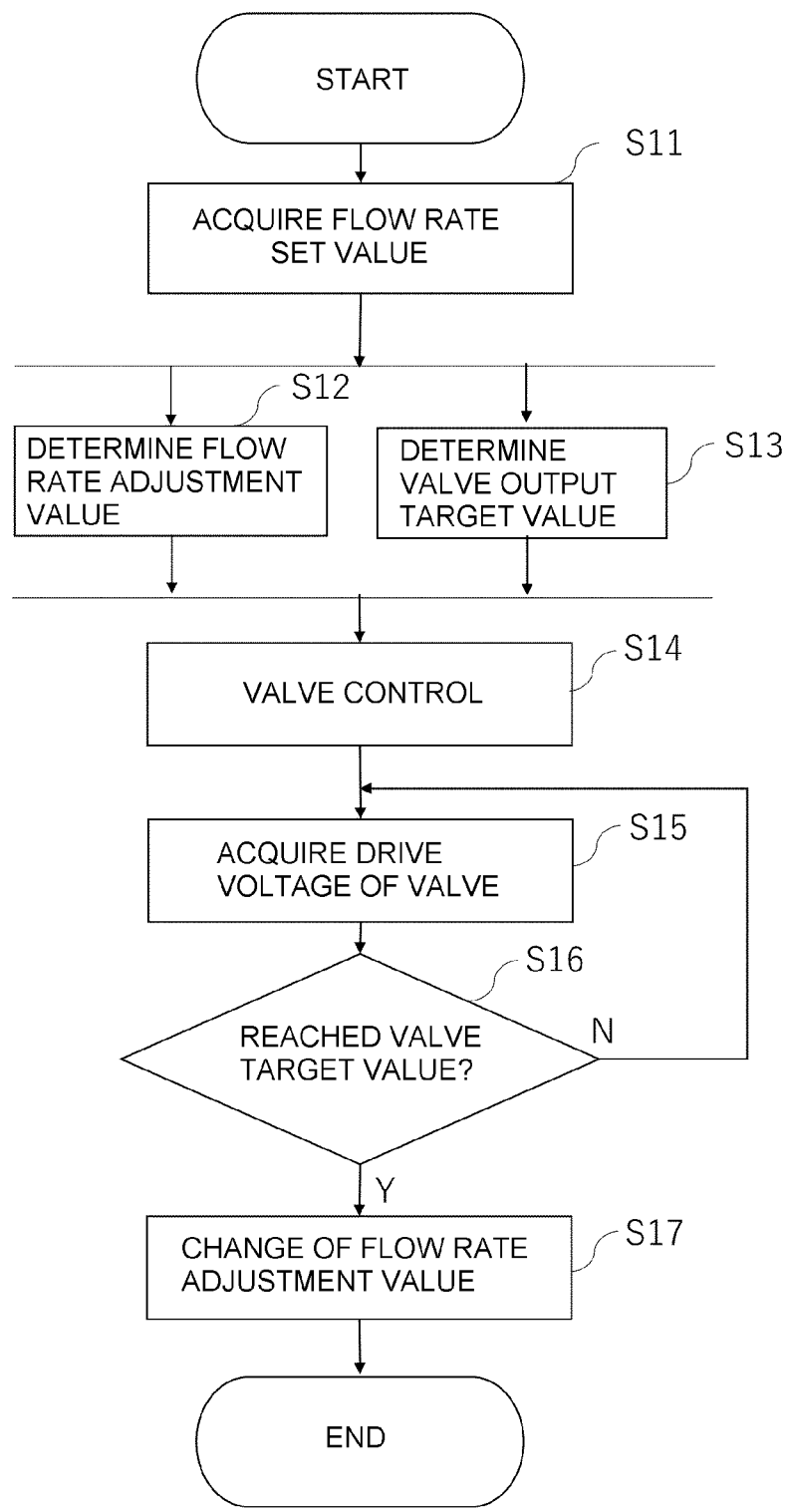
FIG. 4 is a flowchart for changing the flow rate adjustment value based on the drive voltage of the valve.

Flow Chart for Changing Flow Rate Adjustment Value Based on Drive Voltage of Valve Referring to FIG. 4, a flow, in which the next adjustment period is started, that is, the flow rate adjustment value is changed, when the drive voltage of the valve 105 reaches a predetermined valve target value, will be described. As illustrated in FIG. 4, first, the flow rate set value to be set is acquired (S11). Then, the flow rate adjustment value is determined (S12) and the valve target value is determined (S12). Step S12 and step S13 may be executed simultaneously or sequentially.

Then, the valve 105 is controlled so that a difference between each other becomes smaller based on the flow rate set value and the flow rate adjustment value (S14). The drive voltage of the valve 105 is acquired (S15), and whether the drive voltage of the valve 105 reaches the valve target value is determined (S16). When the drive voltage of the valve 105 does not reach the valve target value, the process returns to step S14 after a predetermined time, and the drive voltage of the valve 105 is compared with the valve target value again (S17). When step S16 and step 17 are repeated and the drive voltage of the valve 105 reaches the valve target value, the flow rate adjustment value is changed (S18). At this time, the flow rate adjustment value may be set to a value equivalent to the flow rate set value.

According to this configuration, the flow rate adjustment value can be changed based on a state of an initial operation of the valve 105 even in a time lag from opening of the valve 105 to a reflection in the measured value of the flow rate sensor 102.

Figure 5:
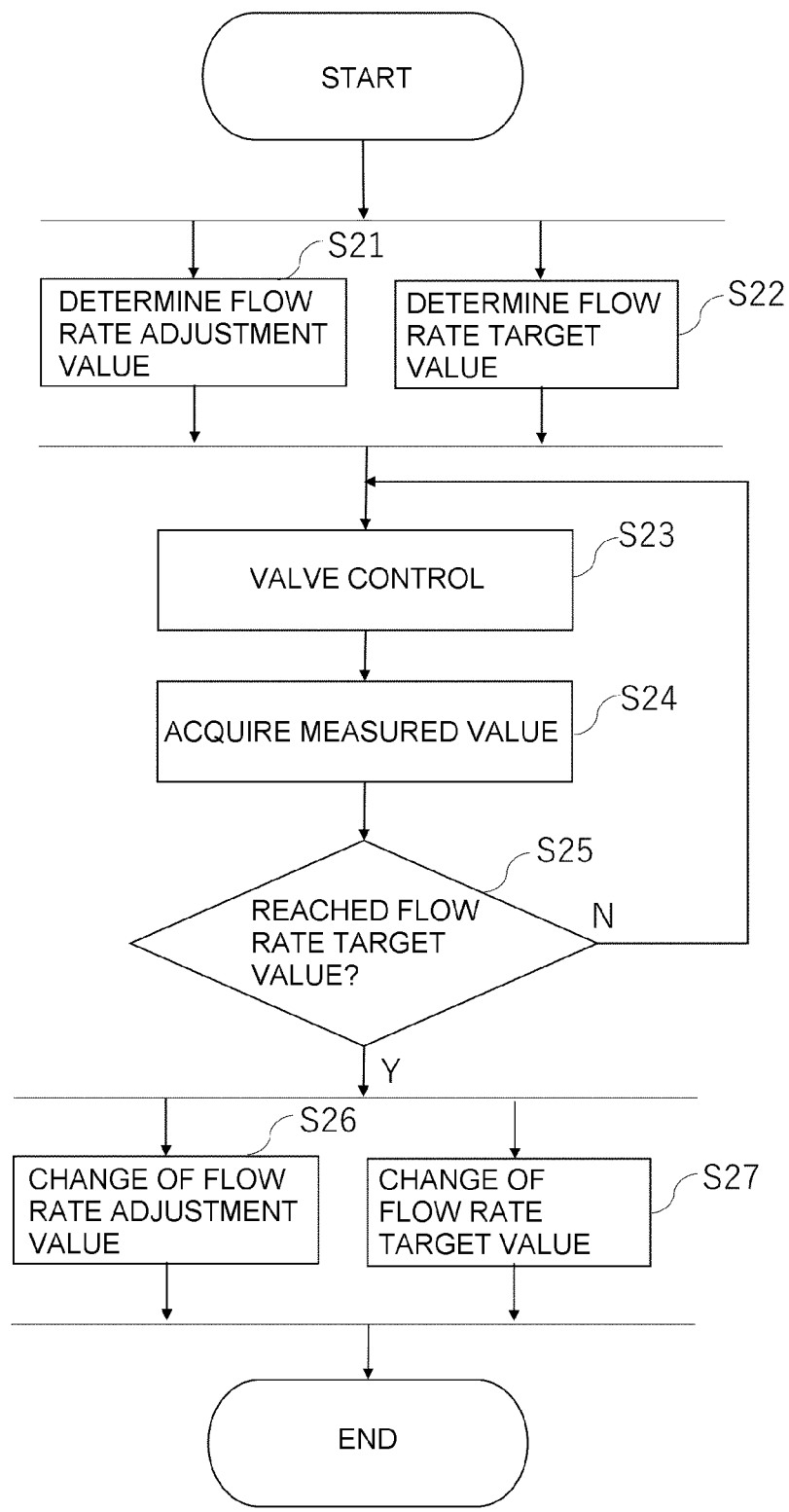
FIG. 5 is a flowchart for changing the flow rate adjustment value based on the measured value of the sensor.

Flow Chart for Changing Flow Rate Adjustment Value Based on Measured Value of Sensor Referring to FIG. 5, a flow, in which a next adjustment period is started when the measured value becomes a predetermined flow rate target value, is described, that is, a flow in which the flow rate adjustment value is changed. As illustrated in FIG. 5, first, a determination of the flow rate adjustment value (S21) and a determination of the flow rate target value (S22) are executed. Step S21 and step S22 may be executed simultaneously or sequentially. Then, based on the flow rate set value and the flow rate adjustment value, the valve 105 is controlled so that a difference between them becomes small (S23). The measured value of the flow rate sensor 102 is acquired (S24), and it is determined whether the measured value has reached the flow rate target value (S25). When the measured value has not reached the flow rate target value, the process goes back to step S23, and the measured value is acquired again after a predetermined time (S24). Step S23 may be executed asynchronously with step S24 and step S25.

In step S25, when the measured value has reached the flow rate target value, the adjustment value determination unit 12 changes the flow rate adjustment value (S26). Further, the flow rate target value determination unit 15 changes the flow rate target value (S27). Step S26 and step S27 may be executed simultaneously in any order.

According to this configuration, the flow rate can be changed by using a behavior of an initial phase of the feedback control before the measured value reaches the flow rate adjustment value. In the feedback control, the greater the difference between the flow rate adjustment value and the measured value, the stronger the feedback is, so that the flow rate can be quickly controlled according to this configuration.

As described above, according to the flow rate control device of the present invention, the flow rate in the controlled object can quickly reach the flow rate set value.

REFERENCE SIGNS LIST 1 flow rate control device
11 setting value acquisition unit
12 adjustment value determination unit
13 measured value acquisition unit
40 drive control circuit
105 valve

The invention claimed is:

1. A flow rate control device for controlling a flow rate of a fluid supplied to a controlled object to reach and to hold a final flow rate, the flow rate control device comprising:
   a measured value acquisition unit acquiring a measured value by a flow rate sensor measuring a flow rate of the fluid;
   a setting value acquisition unit acquiring the final flow rate and setting a flow rate set value to the final flow rate;
   an adjustment value determination unit for determining, while the flow rate set value is at the final flow rate, a flow rate adjustment value different from the flow rate set value; and
   a drive control unit controlling the flow rate of the fluid by adjusting an opening position of a valve supplying the fluid to the controlled object to make a difference between the measured value and the flow rate adjustment value smaller.

2. The flow rate control device according to claim 1, wherein
   the flow rate adjustment value comprises an initial adjustment value set after setting of the flow rate set value; and
   the initial adjustment value is equal to or greater than the flow rate set value.

3. The flow rate control device according to claim 2, further comprising a valve output acquisition unit acquiring the drive voltage of the valve,
   wherein the adjustment value determination unit changes the flow rate adjustment value when the drive voltage of the valve reaches a predetermined valve target value.

4. The flow rate control device according to claim 3, wherein the adjustment value determination unit holds a transient adjustment value, larger than the flow rate set value, as the flow rate adjustment value after the initial adjustment value.

5. The flow rate controller according to claim 3, further comprising a flow rate target value determination unit determining a flow rate target value that is different from the flow rate set value and is a temporary target value of the measurement value,
   wherein the adjustment value determination unit changes the flow rate adjustment value when the measured value becomes the flow rate target value.

6. The flow rate control device according to claim 2, wherein the adjustment value determination unit holds a transient adjustment value, larger than the flow rate set value, as the flow rate adjustment value after the initial adjustment value.

7. The flow rate controller according to claim 6, further comprising a flow rate target value determination unit determining a flow rate target value that is different from the flow rate set value and is a temporary target value of the measurement value,
wherein the adjustment value determination unit changes the flow rate adjustment value when the measured value becomes the flow rate target value.

8. The flow rate controller according to claim 2, further comprising a flow rate target value determination unit determining a flow rate target value that is different from the flow rate set value and is a temporary target value of the measurement value,
wherein the adjustment value determination unit changes the flow rate adjustment value when the measured value becomes the flow rate target value.

9. The flow rate control device according to claim 1, further comprising a flow rate target value determination unit determining a flow rate target value that is different from the flow rate set value and is a temporary target value of the measured value,
wherein the adjustment value determination unit changes the flow rate adjustment value when the measured value becomes the flow rate target value.

10. The flow rate control device according to claim 9, wherein the flow rate target value determination unit changes the flow rate target value when the adjustment value determination unit changes the flow rate adjustment value.

11. The flow rate control device according to claim 10, wherein
the flow rate target value determination unit determines a flow rate target value that becomes a temporary target of the measured value when a transient adjustment value larger than the flow rate set value, and
the adjustment value determination unit changes the flow rate adjustment value when the measured value reaches the flow rate target value.

12. The flow rate control device according to claim 9, wherein
the flow rate target value determination unit determines a flow rate target value that becomes a temporary target of the measured value when a transient adjustment value larger than the flow rate set value, and
the adjustment value determination unit changes the flow rate adjustment value when the measured value reaches the flow rate target value.

13. The flow rate controlling device according to claim 1, wherein
the adjustment value determination unit determines the flow rate adjustment value during a first adjustment period among a sequence of adjustment periods,
the adjustment value determination unit determines another flow rate adjustment value during another adjustment period among the sequence of adjustment periods, and
the adjustment value determination unit determines, corresponding to the sequence of adjustment periods, respective flow rate adjustment values in a manner for bringing the measured value to the flow rate set value.

14. A control method for a flow rate control device for controlling a flow rate of a fluid supplied to a controlled object to reach and to hold a final flow rate, the control method comprising:
a step of acquiring a measured value by a flow rate sensor measuring a flow rate of the fluid;
a step of acquiring the final flow rate and setting a flow rate set value to the final flow rate;
a step of determining, while the flow rate set value is at the final flow rate, a flow rate adjustment value different from the flow rate set value; and
a step of controlling the flow rate of the fluid by adjusting an opening position of a valve supplying the fluid to the controlled object to make a difference between the measured value and the flow rate adjustment value smaller.

15. A computer executable control program, stored in an instruction storage unit of a central processing unit (CPU) of a flow rate control device for controlling a flow rate of a fluid supplied to a controlled object to reach and to hold a final flow rate hold a flow rate, the program comprising CPU-readable instructions that when executed cause the CPU to perform steps comprising steps for:
acquiring a measured value by a flow rate sensor measuring a flow rate of the fluid;
acquiring the final flow rate and setting a flow rate set value to the final flow rate;
determining, while the flow rate set value is at the final flow rate, a flow rate adjustment value different from the flow rate set value; and
controlling the flow rate of the fluid by adjusting an opening position of a valve supplying the fluid to the controlled object to make a difference between the measured value and the flow rate adjustment value smaller.

* * * * *